L. Miller.
Harvester Dropper
Nº 70735      Patented Nov. 12, 1867.
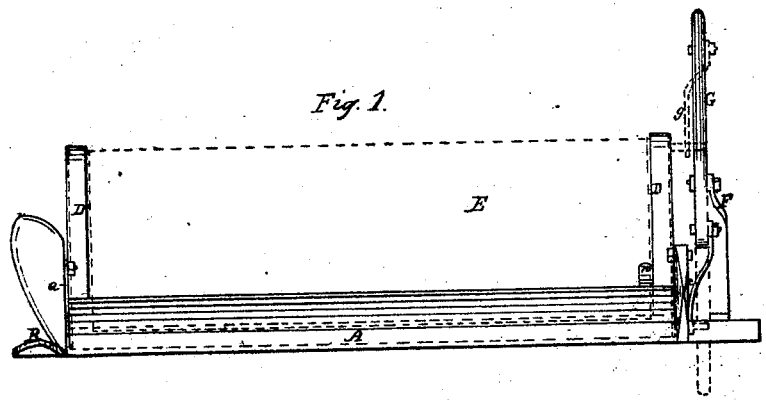
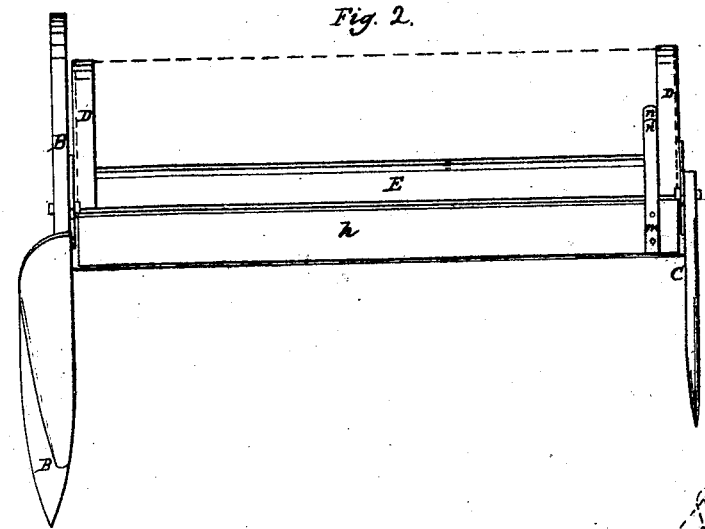
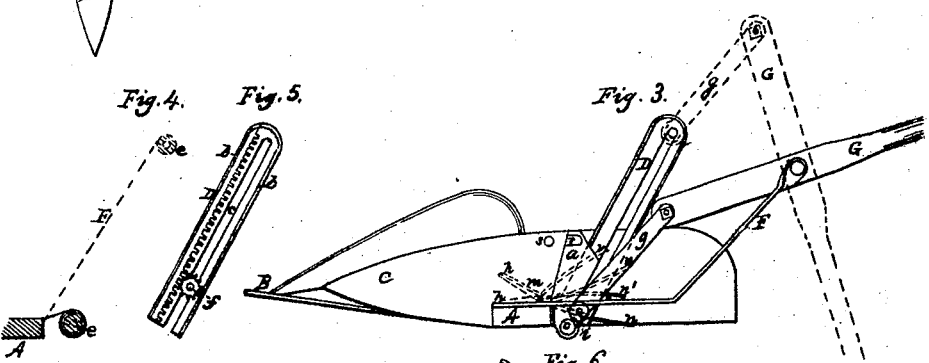
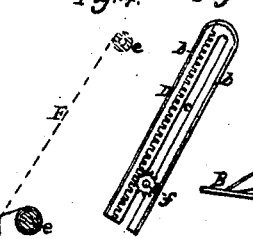
Witnesses.
Inventor. Lewis Miller
By atty. A.B. Stoughton

United States Patent Office.

LEWIS MILLER, OF AKRON, OHIO.

Letters Patent No. 70,735, dated November 12, 1867.

IMPROVEMENT IN DROPPERS FOR HARVESTERS.

The Schedule referred to in these Letters Patent and making part of the same.

TO ALL WHOM IT MAY CONCERN:

Be it known that I, LEWIS MILLER, of Akron, in the county of Summit, and State of Ohio, have invented certain new and useful Improvements in Droppers for Harvesting Machines; and I do hereby declare the following to be a full, clear, and exact description of the same, reference being had to the accompanying drawings, making a part of this specification, in which—

Figure 1 represents a front view of so much of a finger-bar of a harvesting machine and its appliances as will illustrate my invention.

Figure 2 represents a top plan of the same.

Figure 3 represents an end elevation, taken from that end which is next to the main frame of the machine when attached to or connected with the machine.

Figures 4, 5, and 6 represent details of the apparatus, which will be hereafter referred to.

Similar letters of reference where they occur in the separate figures denote like parts in all the drawings.

My invention consists, first, in an apron, of suitably flexible material, one edge of which is connected to the rear of the finger-bar, and the other edge to a roller, which is operated by suitable gear, and by a lever or its equivalent, under the control of the operator, said roller rising up with the apron when it is unrolled, and causing the apron to form an inclined support for the falling grain, until sufficient is accumulated to form a gavel, when, by reversing the mechanism, the roller descends and winds the apron around itself, and allows the grain to drop, and be drawn off on to the ground.

My invention further consists in a hinged holding-board, so operated by or in connection with the rolled and unrolled apron as that, whilst the apron is gathering the cut grain, the holding-board shall lie flat upon the finger-beam or platform, and when the apron is rolled down to deliver the cut grain, said holding-board shall be raised up to catch and hold the falling grain until the apron is again raised up and ready to receive it.

To enable others skilled in the art to make and use my invention, I will proceed to describe the same with reference to the drawings.

A may represent the finger-bar or beam of a harvesting machine, and B the outside and C the inside shoe or divider. On the opposing faces of these two shoes or dividers are attached racks D D, by means of plates $a$ $a$, by which they may be adjusted to more or less inclination, as may be required, the general inclination of these racks being upward and rearward. The racks are shielded by flanges $b$, to prevent them from being clogged, and a slot, $c$, may be made in them for the ends of the roller to run and be guided in. The roller $e$ has a spur-gear, $f$, upon each of its ends, which gears run in the racks D, respectively, at each end of the finger-bar, so that as the roller is raised up or let down it will have a rotation around its axis given to it by the spurs running in the racks. An apron, E, of cloth or leather, has its under edge fastened to the finger-bar or platform, and its upper or other edge fastened to the roller $e$, so that as the roller is let down it winds the apron tightly around itself, and when it is raised it unwinds it again, and makes a fence, against which the falling grain rests and is supported, it having sufficient height and inclination rearward to do so. Upon an arm, F, projecting rearward from the finger-bar, there is hung a lever, G, the rear end of which may extend to or near to the driver's seat or position, so that the occupant of the seat may readily operate it. To the forward end of this lever is connected, by a link, $g$, the journal $i$ of the roller $e$, and by means of this lever and connection the roller $e$ is raised or lowered at pleasure. In front of the apron E there is pivoted by its rear edge a holding-te or bar, $h$, which has a forked arm, $m$, attached to it, and projecting rearward. When the roller is run down it strikes against the under arm $n$ of the forked arm, and, forcing it down, causes the plate or bar $h$ to rise up at its front, as shown by dotted lines in fig. 3, in which position it will hold the falling grain until the apron discharges the gathered gavel, or quantity to make a gavel. When the roller rises it strikes the upper arm $n'$ of the forked arm, and forces down the holding-bar or board flat upon the finger-bar, and allows the apron to receive and hold the grain previously held by said board or bar.

By this construction of dropper, the apron and roller when down occupy so small a space that there is nothing to prevent a free, easy, and regular delivery of the cut grain upon the ground, and in good gavelling order. The racks may be pivoted to the shoes or dividers, as at $o$, fig. 3, and by means of the slot $r$, and et-screw $s$ passing through the divider and slot, be regulated to any proper degree of inclination.

Having thus fully described my invention, what I claim is—

1. An apron for holding the falling grain, that is wound up and unwound by a travelling roller, and rack-and-pinion attachments, substantially as described.

2. I also claim, in combination with a travelling roller, and an apron wound up and unwound by it, a holding-bar or board, that is thrown into and out of action by the roller, substantially as and for the purpose described.

LEWIS MILLER.

Witnesses:
GEORGE MILLER,
WM. M. CUNNINGHAM.